March 28, 1961 T. S. BEAN 2,976,815

BALLAST TAMPER

Filed Nov. 18, 1957 10 Sheets-Sheet 1

INVENTOR.
THEODORE S. BEAN
BY Mellin and Hanscom
ATTORNEYS

March 28, 1961 T. S. BEAN 2,976,815

BALLAST TAMPER

Filed Nov. 18, 1957 10 Sheets-Sheet 2

INVENTOR.
THEODORE S. BEAN

BY Mellin and Hanscom

ATTORNEYS

March 28, 1961 T. S. BEAN 2,976,815

BALLAST TAMPER

Filed Nov. 18, 1957 10 Sheets-Sheet 3

INVENTOR.
THEODORE S. BEAN

BY Mellin and Hanscom

ATTORNEYS

March 28, 1961 T. S. BEAN 2,976,815

BALLAST TAMPER

Filed Nov. 18, 1957 10 Sheets-Sheet 4

INVENTOR.
THEODORE S. BEAN

BY Mellin and Hanscom

ATTORNEYS

INVENTOR.
THEODORE S. BEAN
BY [signature]
ATTORNEYS

March 28, 1961 T. S. BEAN 2,976,815

BALLAST TAMPER

Filed Nov. 18, 1957 10 Sheets-Sheet 6

INVENTOR.
THEODORE S. BEAN

BY Mellin and Hanscom

ATTORNEYS

INVENTOR.
THEODORE S. BEAN
BY Mellin and Hanscom
ATTORNEYS

INVENTOR.
THEODORE S. BEAN
BY Mellin and Hanscom
ATTORNEYS

INVENTOR.
THEODORE S. BEAN
BY Mellin and Hanscom
ATTORNEYS

March 28, 1961 T. S. BEAN 2,976,815
BALLAST TAMPER
Filed Nov. 18, 1957 10 Sheets-Sheet 10

INVENTOR.
THEODORE S. BEAN
BY Mellin and Hanscom
ATTORNEYS 2,976,815
Patented Mar. 28, 1961

2,976,815

BALLAST TAMPER

Theodore S. Bean, 1537 Graff Ave., Oakland, Calif.

Filed Nov. 18, 1957, Ser. No. 697,105
11 Claims. (Cl. 104—12)

This invention relates to and in general has for its object the provision of a ballast tamper of the general character disclosed in my copending application, Serial No. 285,977, filed May 3, 1952, and which issued February 4, 1958, as Patent No. 2,821,935, the present invention being an improvement over and a continuation-in-part of the invention disclosed in my said copending application.

Both inventions include a truck arranged to traverse the rails of a railroad track, a carriage mounted on the truck for limited transverse movement thereon, an elevator mounted on the carriage, tamping gun mounts mounted on the elevator, and tamping guns carried by said mounts.

In both cases the tamper is designed to assume one of three principal positions: a transporting position during such times as the machine is out of use altogether or is being transported to some other destination; an operative position with its tamping shoes vibrating in the ballast; and an intermediate position for moving the tamper from a point over one tie to a point over an adjacent tie.

In the tamper disclosed in my Patent No. 2,821,935 it is necessary to elevate the entire elevator including its gun mounts when moving the tamper from a position over one tie to a position over an adjacent tie. Considerable power is required to accomplish this.

One of the principal objects of the present invention is the provision of a tamper of the general character disclosed in my said patent, but wherein when moving from tie to tie it is necessary to elevate only the gun mounts rather than the entire elevator.

In the tamper disclosed in my said patent, the tamping unit is mounted between the two axles of its supporting truck, and for that reason it is in part supported by untamped and loose ballast.

Another object of this invention is the provision of a tamper of the general character disclosed in my said patent, but wherein the tamper per se is supported cantileverwise from its truck thereby obviating the necessity of supporting the truck on untamped and loose ballast.

Still another object of this invention is the provision in a tamper of the character described of an elevator including lower and upper elevator units actuated by lower and upper cylinders provided respectively with lower and upper double acting pistons fixed to a common piston rod.

Another object of the invention is the provision in a tamper of the character above described of a pneumatic actuating system for operating the tamper carriage, the elevator units and the tamping gun reciprocators being under the control of a cycling timer.

The invention possesses other advantageous features, some of which, with the foregoing, will be set forth at length in the following description where those forms of the invention which have been selected for illustration in the drawings accompanying and forming a part of the present specification, are outlined in full. In said drawings, one form of the invention is shown, but it is to be understood that it is not limited to such form, since the invention as set forth in the claims may be embodied in other forms.

Referring to the drawings.

*General assembly*

Generally and as shown in the various figures above described, the objects of my invention have been embodied in a unit including a power truck arranged to traverse the tracks of a railroad and provided at its forward end with a cantilevered tamper frame F; a carriage C mounted on the frame F for transverse movement thereon; a pair of identical elevator assemblies E mounted on said carriage; tamping guns G mounted on each of said elevator assemblies; and an automatic control system S operatively associated with said tamper for controlling its operation.

*Truck*

Figure 1:
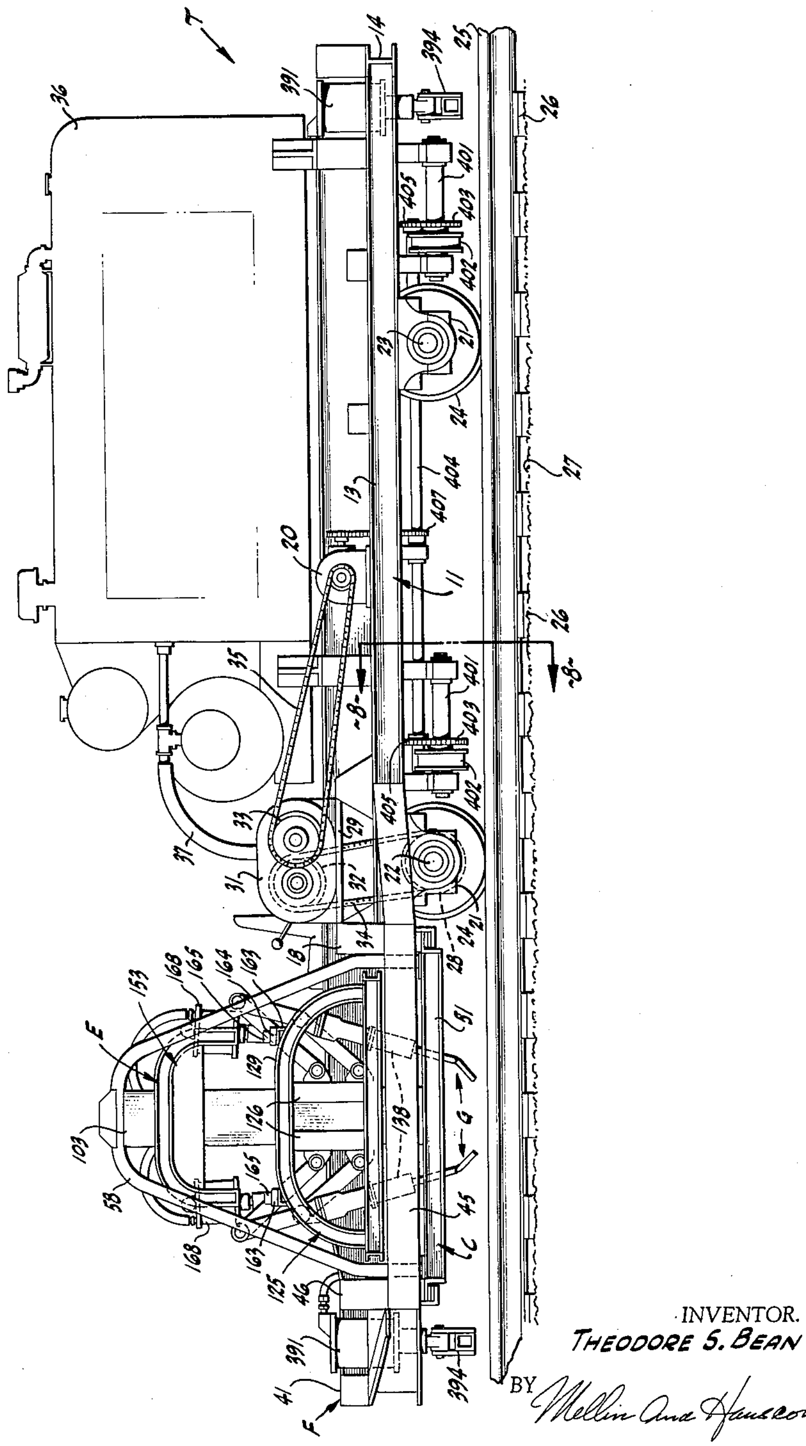
Fig. 1 is a side elevation of a ballast tamper embodying the objects of my invention.
Figure 2:
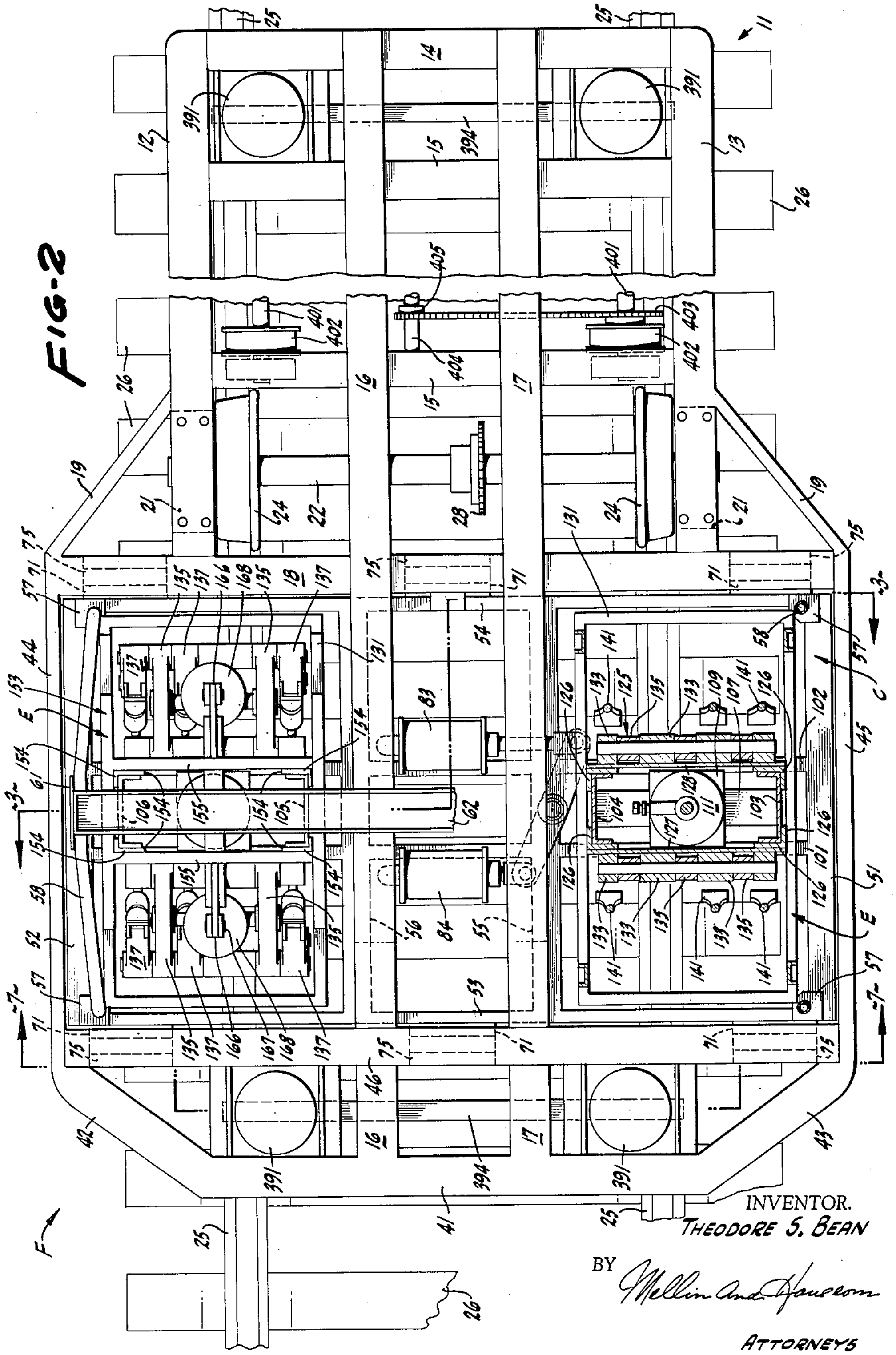
Fig. 2 is a top plan view of the tamper shown in Fig. 1 with its lower half broken away on the section line 2—2 of Fig. 3 and with the compressor and auxiliary equipment removed to better illustrate the underframe and tamping unit.

As best shown in Figs. 1 and 2, the truck T includes a generally rectangular steel fabricated truck frame 11, including side I beams 12 and 13 and a rear end channel 14. Welded to and extending across the side channels 12 and 13 are spaced parallel cross I beams 15, and welded to the end channel 14 and the cross-beams 15 is a pair of parallel, transversely spaced I beams 16 and 17 extending a substantial distance forward (to the left as shown in Figs. 1 and 2) of the truck frame 11 cantileverwise, and which, as will presently more clearly appear, serve as the main supports for tamper frame F above referred to.

Welded to the forward ends of the side I beams 12 and 13 is a transverse I beam 18 serving as the front end of the truck frame 11 and as the rear end of the tamper frame F. Welded to the outer ends of the I beam 18 and the side I beams 12 and 13 are diagonal bracing members 19.

Bolted or otherwise secured to the front and rear ends of the side I beams 12 and 13 are bearings 21, and journaled therein are forward and rear axles 22 and 23. Fixed to the axles 22 and 23 are conventional flanged wheels 24 having traction with the rails 25, the rails 25 being supported on ties 26 which in turn are supported on the ballast 27 of the roadbed.

Keyed or otherwise secured to the front axle 22 is a sprocket wheel 28. Secured to the front end of the truck frame 11 is a platform 29, and mounted thereon is a gear box 31 including sprocket wheels 32 and 33. Reeved about the sprocket wheels 28 and 32 is a drive chain 34, and reeved about the sprocket wheel 33 is a sprocket chain 35 driven by a compressed air motor 20 mounted on the frame 11.

Mounted on the truck frame 11 is a conventional air compressor unit 36 for operating the air motor above referred to and for otherwise powering the various units of the tamper as will presently more clearly appear through a high pressure supply line 37.

*Tamper frame F*

As above described, the forward ends of the I beams 16 and 17 serve as the main cantilevered support for the tamper frame F and permit the tamper to overlie a portion of the roadbed requiring tamping while the track T is being supported on a section of the roadbed which has already been tamped. Welded across the front ends of the I beams 16 and 17 is a front cross I beam 41 provided with rearwardly bent end sections 42 and 43 generally opposing the bracing members 19. Welded between the beam section 42 and the transverse beam 18 is a frame side beam 44, and similarly welded to the beam section 43 and the transverse beam 18 is a frame side beam 45. Extending between the forward ends of the side beams 44 and 45 is a flat bar 46, the top plates of the beams 16 and 17 being cut away for this purpose and so as to permit the bar 46 to be welded to the vertical webs of the beams 16 and 17. Here it should be noted that the details of fabrication of the frame F are of no particular importance and are largely a matter of design. As indicated in Figs. 1, 3, 7, and 8, the frame F declines laterally from each of its longitudinally extending main beams 17, and as a result of this the side beams 44 and 45 are located on a plane substantially lower than the plane of the center beams 16 and 17.

Up to this point, a more or less conventional truck has been described provided with a forwardly extending cantilever supported tamper frame, and provided with a conventional air compressor and with a conventional compressed air motor for driving the truck through a conventional transmission (gear box 31).

*Reciprocating carriage C*

Included in the carriage C is a fabricated rectangular steel base frame made up of parallel side H beams 51 and 52 welded at their ends to front and rear channel beams 53 and 54. Extending between the front and rear beams 53 and 54, and welded thereto, is a pair of transversely spaced, symmetrically disposed H beams 55 and 56.

Secured to and over the four corners of the base frame above described are corner plates 57. Welded to each side pair of plates 57 is an upwardly converging, inverted, outwardly inclined U frame 58, the two frames 58 being in transverse alignment with each other. Conveniently, the frames 58 can be constructed of pipe. Extending between the frames 58 and secured to the upper ends thereof by angles 59 and plates 61 is a channel beam 62.

Figure 9:
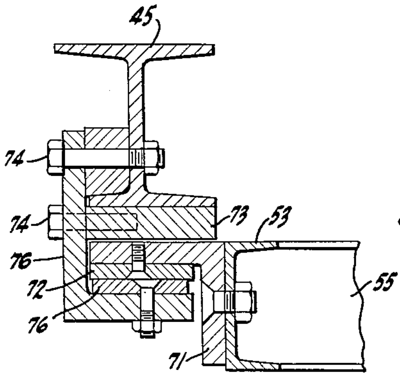
Fig. 9 is a fragmentary vertical section taken on the section line 9—9 of Fig. 7.

Bolted to each end of the carriage front and rear beams 53 and 54 are laterally extending angle sections or runners 71 each provided on its lower face with a removable shoe or wear plate 72 (Fig. 9). Welded to the lower faces of the transverse frame beams 44 and 45 adjacent each other thereof, is a plate 73, and secured thereto by bolts 74 is an angle track 75. Removably secured to the upper face of the flange of each track 75 is a wear plate 76, this structure serving as a support for the outwardly extending flange of the runners 71. As a result of this construction, the carriage base is suspended or underslung from the tamper frame F for limited transverse movement.

*Carriage actuator*

Fixed to the lower flange of the beam 16 are longitudinally spaced plates 81 and 82 (Figs. 3 and 10), and pivoted respectively thereto are pneumatic cylinders 83 and 84. Included in the cylinders 83 and 84 are conventional pistons respectively provided with piston rods 85 and 86. Here it should be noted that sometimes hereinafter the word "cylinder" will be used to denote not only the cylinder shell per se, but the shell as well as its piston and piston rod, all in accordance with trade practice.

Pivoted in the cylinder 84 are air connections **84*a* and 84*b*, and similarly provided in the cylinder 83 are air connections 83*a* and 83*b***.

Figure 10:
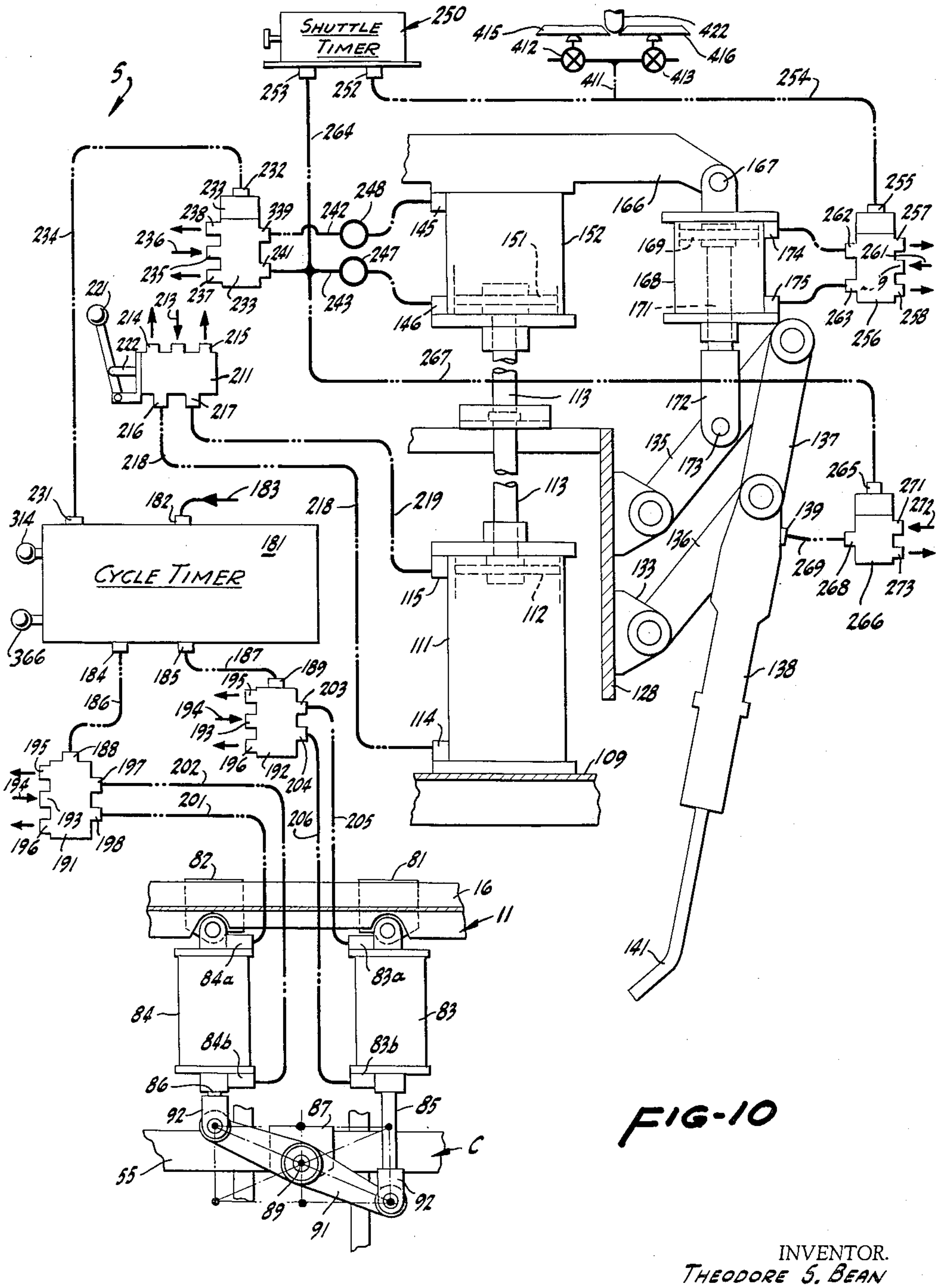
Fig. 10 is a diagrammatic illustration of the control system for actuating the tamper.

Welded or otherwise secured to the H beam 55 of the tamper carriage C is a plate 87, and mounted thereon is a bearing 88. Journaled in the bearing 88 is a pin 89, and secured thereto is a rockerarm 91, the free ends of which are pivoted to the free ends of the piston rods 85 and 86 through fittings 92, all as best shown in Fig. 10. Since the cylinders per se are pivoted to the fixed frame of the tamper and their connecting rods are connected to the movable tamper carriage, the carriage will of course move in response to the movement of either one or both of the piston rods 85 and 86. If, for example and as shown in Fig. 10, the piston rod 85 is considered as being in its fully extended position and the piston rod 86 as being in its fully retracted position, the inward movement of the rod 85 to its fully retracted position will result in the upward movement of the carriage (as viewed in Fig. 10) to one of its limiting positions. Here both of the rods are in their fully retracted positions. If now either of the rods, say the rod 85, is moved outwardly to its fully expanded position as shown in Fig. 10, the carriage will move downwardly as viewed in this figure to an intermediate or central position. By holding the rod 85 in its expanded position and then moving the rod 86 from its fully contracted position to its fully extended position, the carriage C will move downwardly (as viewed in Fig. 10) from its central position to its other limiting position. By selectively actuating the cylinders 83 and 84 it then becomes possible to cause the carriage C to reciprocate back and forth transversely of the tamper frame F and to hold or lock the carriage in a selected position.

*Carriage elevators*

Extending transversely across the base of the carriage and welded to the carriage side beams 51 and 52 is a pair of central, longitudinally spaced channel beams 101 and 102. Fastened between the carriage top channel beam 62 and the beams 101 and 102 are two transversely spaced pairs of vertical channels 103 and 104, and 105 and 106, the channels 103 and 104 serving as one elevator mast on one side of the carriage and the channels 105 and 106 forming another identical elevator mast on the opposite side of the carriage.

Figure 4:
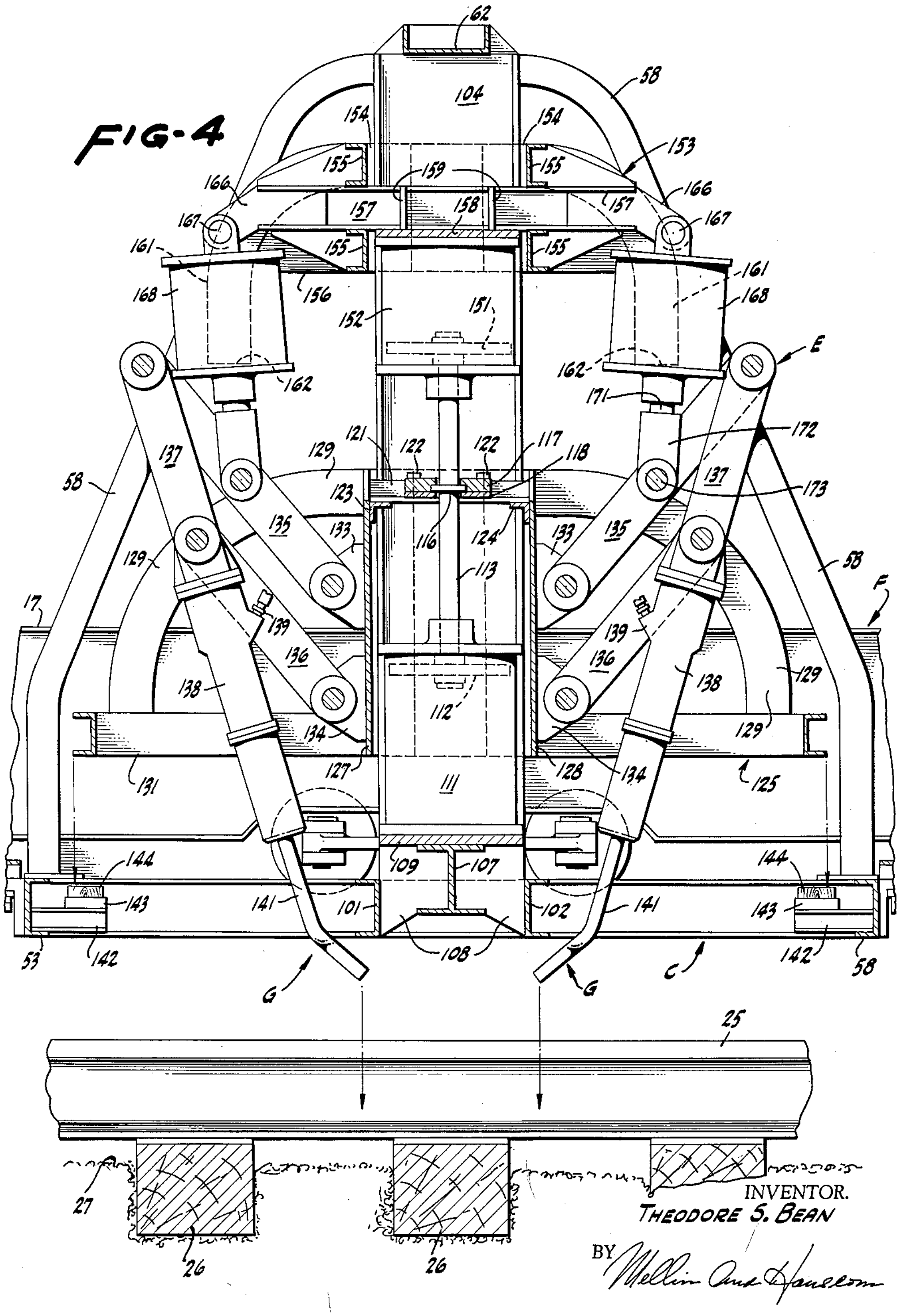
Fig. 4 is a vertical section taken on the section line 4—4 of Fig. 3 showing my tamper in its transporting position.

Extending across the lower ends of each pair of channels 103 and 104, and 105 and 106 is an I beam 107 reinforced by cross plates 108 (Fig. 4). Mounted on top of each of the beams 107 is a rectangular steel pad 109, and seated and fastened to each pad 109 is a cylinder 111. Here it should be observed that the carriage C is symmetrical with respect to the longitudinal center line of the tamper and that it carries identical elevator assemblies on each side thereof.

Operatively associated with each cylinder 111 is a piston 112, and secured thereto is a connecting rod 113. Communicating with the lower end of the cylinder 111 is a nipple 114, and communicating with the upper end of the cylinder is a nipple 115.

Figure 3:
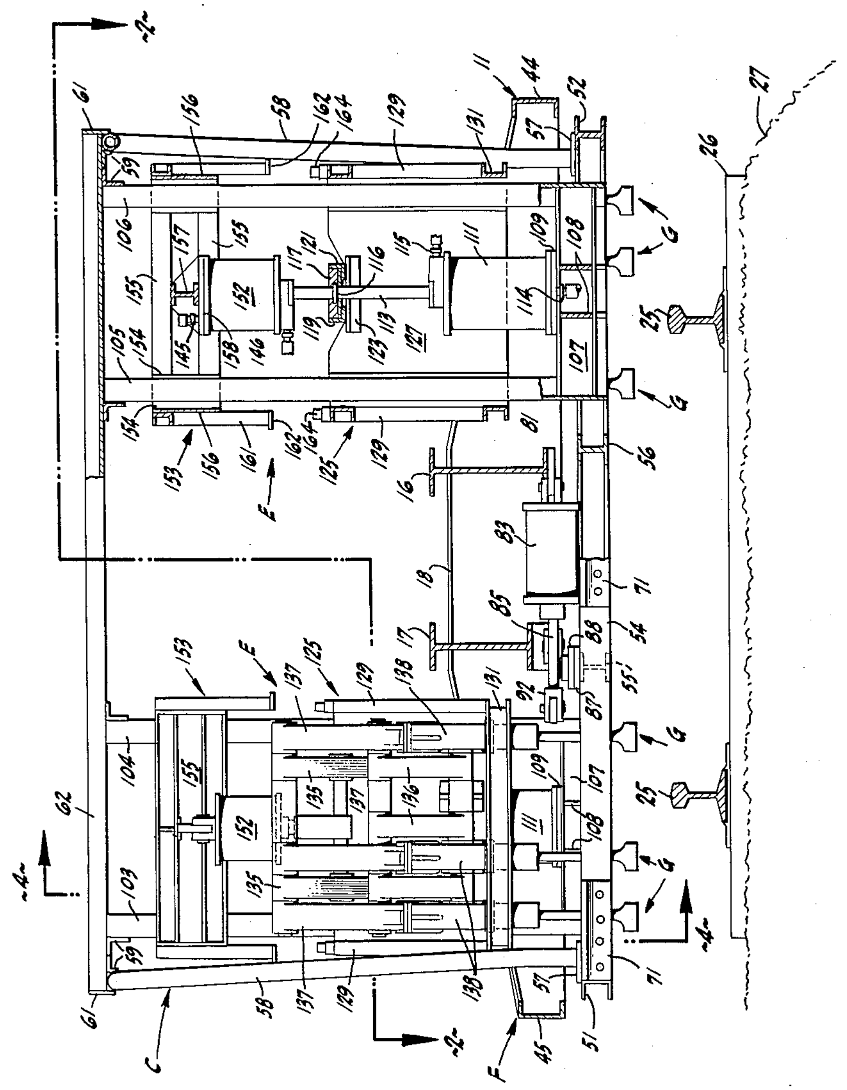
Fig. 3 is a vertical section taken on the section line 3—3 of Fig. 2.

Formed integral with the connecting rod 113 above the cylinder 111 is an annular ring or flange 116 (Figs. 3 and 4). Mounted over the connecting rod 113 and its flange 116 is a counterbored plate 117, and underlying the flange is a plate 118. Extending along two of the opposed sides of the above structure are angle sections 119 and 121, bolts 122 serving to lock this assembly into an integral but quickly detachable structure. Disposed beneath the angle sections 119 and 121 at right angles, and welded thereto, is a pair of spaced parallel angle sections 123 and 124.

*Lower elevator assembly*

Disposed over each of the two masts constituted by the two pairs of upright channels 103 and 104, and 105 and 106 is a generally rectangular lower elevator unit generally designated by the reference numeral 125. Each elevator unit includes four upright corner angle sections 126 nested over the corners of the mast channels 103 and 104, and 105 and 106 and slidable thereon. Welded to each forward pair of angle sections 126 is a forward vertical plate 127, and similarly welded to each rear pair of vertical angle sections 126 is a rear vertical plate 128. Welded to each front and rear pair of angle sections 126 is a downwardly facing arcuate hanger channel 129, and welded to the lower ends thereof is a rectangular frame 131 conveniently made of channel iron. The entire structure is carried by the connecting rod 113 through the angle sections 119, 121, 123, and 124 by welding these sections to the upright plates 127 and 128 and to arcuate hanger channels 129. As a result of this construction, it will be seen that each of the two laterally adjacent lower elevator units is constrained to move up and down in response to the up and down movement of the connecting rod 113 of its associated fixed cylinder 111 and that this movement can be controlled by the application of air under pressure to the lower and upper air nipples 114 and 115.

Welded to and extending fore and aft from the front and rear plates 127 and 128 of each lower elevator unit 125 are vertically aligned upper and lower pivot lugs 133 and 134, and pivoted thereto are links 135 and 136 which in turn are pivoted at their free outer ends to an outer link 137 (Fig. 4). Here it should be noted that since the links 135 are substantially longer than the links 136, this structure does not result in a linked parallelogram and that consequently each link 137 does not move in parallelism with itself.

Secured rigidly to each of the links 137 is a tamping gun 138 provided with an air intake connection 139 and with a tamping shoe 141. From an inspection of Fig. 4, it will be noted that the structure thus far described is symmetrical with respect to a transverse vertical plane passing through the axis of the cylinder 111. From an inspection of Fig. 3, it will be further noted that each of the two elevator units 125 includes three pairs of tamping guns, two outboardly of the adjacent rail 25 and one inboardly thereof.

Welded to the lower flanges of the carriage front and rear base channels 53 and 54 adjacent each end thereof is a channel section 142, and welded thereto in vertical alignment with rectangular elevator frame 131 is an annular socket 143 for the reception of a wooden stop pad 144 of a preselected height. As a result of this structure the pads 144 serve as seats for the frame 131. Here it should be noted that the elevator frame 131 is sufficiently smaller than the carriage frame so as to permit the former to enter the latter.

*Upper elevator assembly*

Secured to the upper end of each of the connecting rods 113 is a piston 151 operatively disposed within an air cylinder 152 (Fig. 4). Connected to the upper end of the cylinder is an air nipple 145, and connected to the lower end of the cylinder is an air nipple 146.

Surrounding each of the elevator masts is an upper elevator unit generally indicated by the reference numeral 153. Each of these units includes an upright angle section 154 nested over each of the corners of the mast channels 103, 104, 105, and 106 (Fig. 2, upper part, and Fig. 4). Welded to the angle sections 154 are vertically spaced, transverse channel sections 155, and welded to an across the ends of the channel sections 155 and to the angle sections 154 are plates 156 (Fig. 3). This structure then constitutes a generally rectangular form circumscribing its associated mast and slidable thereon.

Secured to and extending between each pair of channels 155, at right angles thereto and in line with the cylinder 152, is an I beam 157 (Figs. 3 and 4). Welded to the I beam 157 is a plate 158 reinforced by webs or gussets 159 and to which the upper end of the cylinder 152 can be adjustably bolted. Adjustment here between the plate 158 and the cylinder 152 is required in order to insure that the cylinder 152 is secured to the upper elevator 153 in coaxial relationship with the connecting rod 113 and the cylinder 111.

Welded to each of the two plates 156 of each elevator unit 153 are channel arches 161 provided at their free ends with shoes 162.

Figure 5:
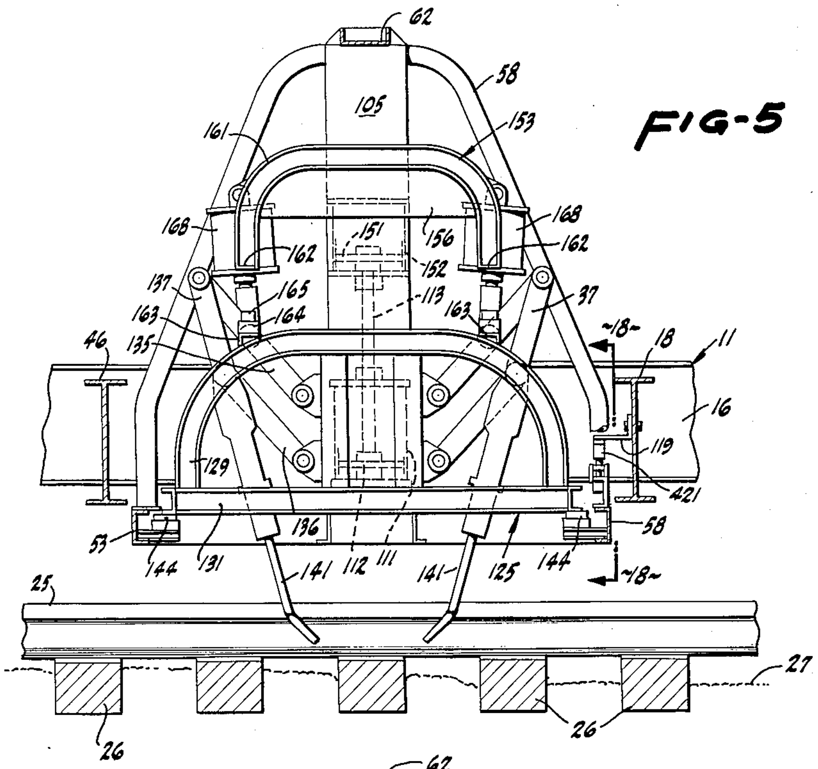
Fig. 5 is a view similar to that shown in Fig. 4 but showing the tamper in its intermediate position whereby it can travel from tie to tie.
Figure 6:
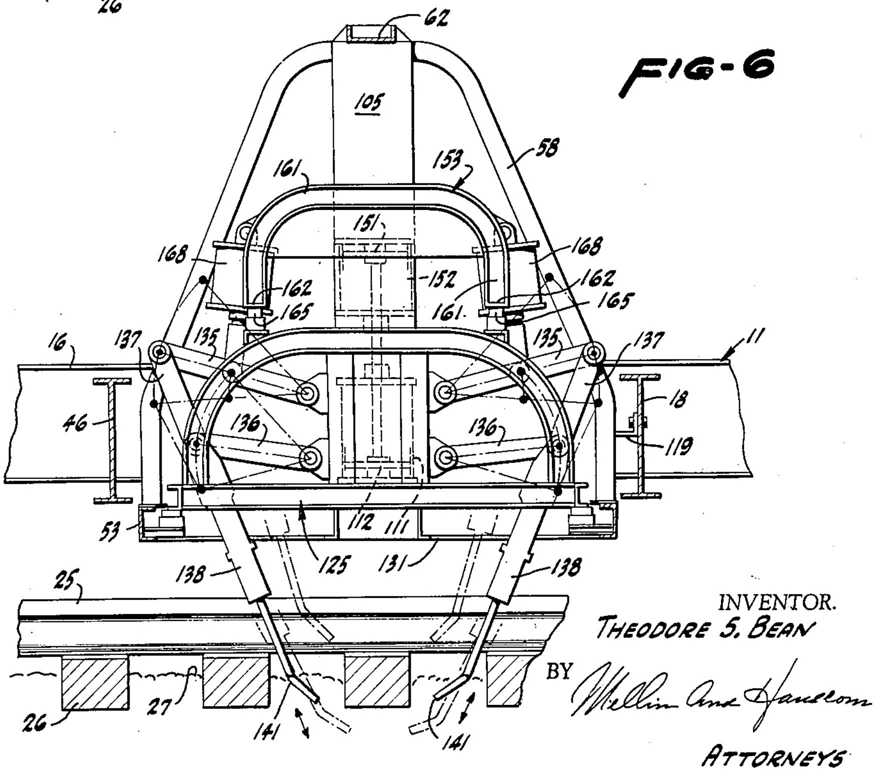
Fig. 6 is a view similar to that shown in Fig. 5 but illustrating the device in its operative or tamping position.
Figure 7:
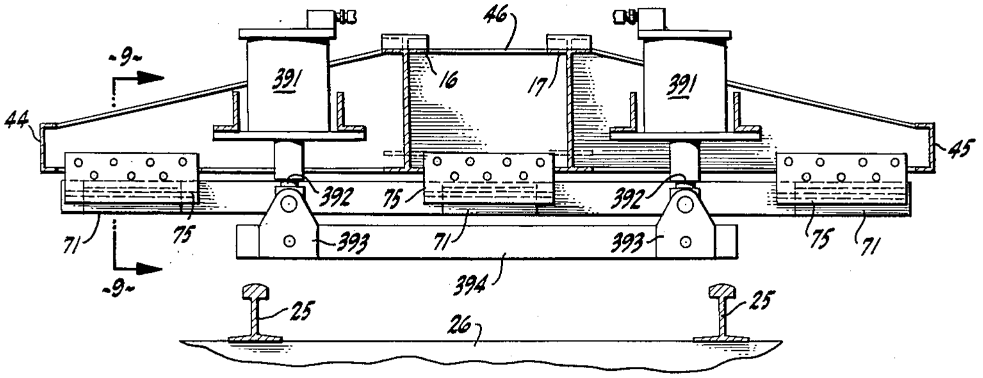
Fig. 7 is a vertical section taken on the section line 7—7 of Fig. 2.
Figure 8:
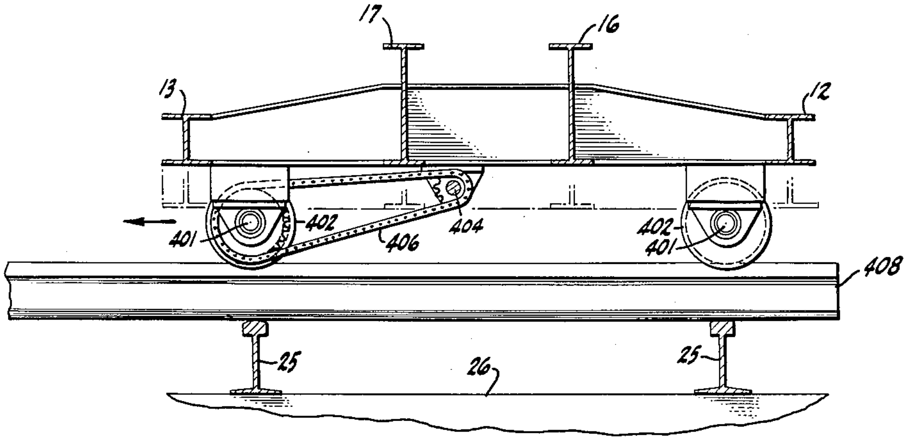
Fig. 8 is a fragmentary vertical section taken on the section line 8—8 of Fig. 1.

Mounted on the upper ends of the arcuate hanger channels 129 of the lower elevator units 125 in vertical alignment with the shoes 162 are seats 163, and secured to each of these seats is a retainer 164 for the accommodation of a stop block 165 (Figs. 5 and 6).

Secured to each end of the I beam 157 and extending outwardly therefrom is an arm 166, and pivoted to the outer end of each arm 166 by a pin 167 is a shuttle cylinder 168. Operatively associated with the cylinder is a piston 169 and a connecting rod 171 (Fig. 10). Provided on the lower free end of the piston 169 is a fork 172, the fork 172 being pivoted to the link 135 by a pin 173. Provided in the upper and lower ends of each cylinder 168 are air connections or nipples 174 and 175.

As a result of this construction, it will be seen that since the lower elevator unit 125 is carried by the piston rod 113 its position will be determined solely by the position of the piston 112 within the cylinder 111. However, the position of the upper elevator unit 153 depends upon two factors. First, it depends upon the position of the cylinder 152 relative to its piston 151, and second, it depends upon the position of the piston 151 relative to the lower cylinder 111. This of course means that the elevation of the tamping guns 138 can be adjusted in several ways. More specifically, it means that to adjust the machine from its tamping position as shown in Fig. 6 to its intermediate position as shown in Fig. 5 for transporting the machine from tie to tie, it is necessary to elevate only the upper elevator unit 153. To accomplish this, air is introduced to the upper end of the upper cylinder 152 while air is allowed to escape from its lower end without permitting the rest of the system to change.

*Summary of tamper movements*

As above indicated, the tamper carriage C is arranged to reciprocate transversely over the tamper frame F, this movement being effected by the cylinders 83 and 84 (Fig. 10). The movement of the lower and upper elevator units 125 and 153 are effected through the action of the cylinders 111 and 152, and the cylinders 168 operate to reciprocate the tamping guns 138 up and down when they are in their tamping position as shown in Fig. 6. This latter movement of the guns 138 is of course in addition to the vibratory movement of the gun shoes 141 under action of the guns per se.

*Automatic control system*

Associated with the ballast tamper as above described is an automatic system for controlling the operation of the various cylinders of the tamper, this system in part being diagrammatically illustrated in Fig. 10. More specifically, Fig. 10 illustrates this control system with respect to one tamper of one of the rear sets of tamping guns associated with only one side of the carriage C. The remaining guns of this set are connected in parallelism with the gun specifically illustrated, and likewise the guns of the opposed forward set of guns are connected in parallelism with the gun illustrated so as to operate in unison therewith. Here it should be reiterated that the transversely movable carriage C mounts two independently operable, transversely opposed elevators, one on each side of the carriage, and that each elevator and its associated guns is operated as above indicated with reference to Fig. 10.

More specifically, there is associated with the carriage C and its two independently operable elevator assemblies a common cycle timer 181. Provided in the cycle timer 181 is a compressed air intake port 182 communicating through an air line 183 with the air supply line 37 (Figs. 1 and 10). Similarly provided in the cycle timer 181 are outlet ports 184 and 185 communicating respectively through air lines 186 and 187 and with the ports 188 and 189 of conventional four-way spring return valves 191 and 192.

*Carriage control*

Provided on each of the valves 191 and 192 is an air intake port 193 communicating through a line 194 with the air supply line 37. Each valve is also provided at its ends with exhaust ports 195 and 196 for respectively exhausting each end thereof. Provided in the valve 191 are ports 197 and 198 respectively communicating with the ports **84*a* and 84*b* of the cylinder 84 through air lines 201 and 202. Similarly, the valve 192 is provided with ports 203 and 204 respectively communicating with the ports 83*a* and 84*a* through air lines 205 and 206**.

In the inactive position of the valves 191 and 192 the air lines 186 and 187 are dead, the plungers or cylinders associated with the valves 191 and 192 are spring biased to their uppermost positions so that air under pressure from the port 193 of the valve 191 passes through the valve into its outlet port and through said port into the line 202. Under these conditions air under pressure is delivered to and maintained on the underside of the piston associated with the cylinder 84. In the meantime, air within the upper end of the cylinder 84 is exhausted to atmosphere through the line 201 and one of the exhaust ports of the valve 191. During this cycle of operation of the cylinder 84 the companion cylinder 83 is maintained with its piston in its lowermost position by air under pressure acting on the upper side of the piston.

With the two cylinders 84 and 83 in the positions shown in Fig. 10, the carriage C is in its central position. To move the carriage C to the left of this central position the cycle timer 181 operates to activate the valve 192 against the action of its biasing spring. As a result of this, the valve 192 delivers compressed air to the lower end of the cylinder 83 and exhausts air from its upper end. This action in turn results in rotating the rockerarm 91 counterclockwise about the fitting 92, and since the rockerarm is pivotally connected to the carriage C, the latter will move to the left. In the meantime, the piston associated with the cylinder 84 is held stationary by the action of the valve 191. To now bring the carriage C back to its central position either end of the rockerarm 91 can be moved away from its associated cylinder and, following that, the carriage can be moved to its right hand position by activating the other of the cylinders 83 and 84. Which of these operations takes place is of course determined by the operation of the cycling timer 181. Here it should be noted that a complete cycle of operation of the carriage C consists in moving, say from its central position to its left hand position; from this latter position back to its central position; from its central position to its right hand position; and from its latter position back to its central position. The central position of the carriage C and its associated sets of tamping guns is illustrated in Figs. 2 and 3, although in Fig. 3 the tamping guns are in their uppermost, transporting position.

*Elevator manual control*

Although the upper elevator assembly of my tamper is under the control of the cycling timer 181, the lower elevator assembly, as illustrated in Fig. 10, is controlled independently of the cycle timer, for example, a conventional hand operated, spring return, four-way valve 211.

Like the valves 191 and 192, the valve 211 includes a compressed air inlet port 212 communicating through an air line 213 with the air line 37 and with alternate exhaust ports 214 and 215. Also included in the valve 211 are alternate ports 216 and 217 communicating respectively through lines 218 and 219 with ports 114 and 115 of the cylinder 111. The plunger or piston of the valve 211 is spring biased and is under the control of an operating lever 221 through the piston stem 222. With the valve as shown in Fig. 10, air from the line 213 passes through the valve and the line 218 to the underside of the piston 112, while air from the upper end of the cylinder 111 is exhausted through the line 219 and the valve 211 to one of the exhaust ports 214 and 215. By moving the operating lever 221 to the right, the reverse situation is effected, namely, compressed air passes through the valve 211 and the line 219 to the upper end of the cylinder 111, while in the meantime the lower end of the cylinder 111 is being exhausted through the line 218 and the valve 211.

In the transporting position of the tamper—the position wherein it is being moved not merely from tie to tie but from station to station—the piston 112 of the cylinder 111 is in its uppermost position, and the movable cylinder 152 is also in its uppermost position, all as illustrated in Fig. 10. However, it is to be noted that the hand controlled valve 211 actuates only the piston 112.

*Upper elevator unit control*

Provided on the cycle timer 181 is an air port 231, and connected between this port and the port 232 of a conventional four-way spring return valve 233 is an air line 234. Included in the valve 233 is a compressed air intake port 235 communicating through a line 236 with the air supply line 37 and exhaust ports 237 and 238. Also included in the valve 233 are ports 239 and 241 communicating respectively through lines 242 and 243 with the ports 145 and 146 of the upper elevator assembly cylinder 152. As a result of this construction, the valve 233 under the control of the cycle timer 181 operates selectively to deliver compressed air to either the upper or lower end of the cylinder and simultaneously to exhaust the lower or upper end of said cylinder. In this position of the cylinder 152, as illustrated in Fig. 10, compressed air disposed in the upper end of the cylinder is serving to hold the cylinder in its uppermost position relative to its piston 151, and the connecting rod 113 is being held in its uppermost position relative to the cylinder 111 by air under pressure disposed beneath the piston 112. Both of the elevator units are therefore in their uppermost position. Preferably, quick acting air exhaust check valves 247 and 248 are disposed in the lines 243 and 242 so as to accelerate the movement of the cylinder 152 in either direction.

*Control for shuttle movement of air guns*

During the vibratory movement of the tamper heads 141 it is preferable to reciprocate the guns up and down within a limited range, this movement being hereinafter referred to as a shuttling movement.

To provide for this movement the control system includes a shuttle timer 250, including a conventional four-way balanced valve 251 provided with air ports 252 and 253. Communicating with the port 252 through an air line 254 is the port 255 of a conventional spring return four-way valve 256 identical with the valves 191, 192, 211 and 233. Like these latter valves, the valve 256 includes exhaust ports 257 and 258 and an intake port 259 communicating through an air line 261 with the high pressure air line 37. The plunger or piston of the valve 256 serves to establish communication selectively between the air port 261 and one of two ports 262 and 263, which in turn respectively communicates with the ports 174 and 175 of the cylinder 169. As a result of this construction, the valve 256 under the control of the shuttle timer 251 serves to reciprocate the tamping guns 138 up and down. Here it should be observed that the shuttle timer 250 operates under the control of the valve 233, for its source of air under pressure (working medium) is derived from the valve 233 through a line 264 and a portion of the line 243. The valve 233, as previously described, is itself under the control of the cycle timer 181.

*Control of air supply to tamping guns*

Extending between the line 243 and the port 265 of a conventional spring return three-way valve 266 is an air line 267. Included in the valve 266 is port 268 communicating through a line 269 with the port 139 of the gun 138, an air intake port 271 communicating through a line 272 with the high pressure line 37, and an exhaust port 273. Although the line 267 is in communication with the line 264, it is to be noted that the valve 273 is not under the control of the shuttle timer 250 but only under the control of the valve 233 and the cycle timer 181.

*Details of cycle timer*

Figure 11:
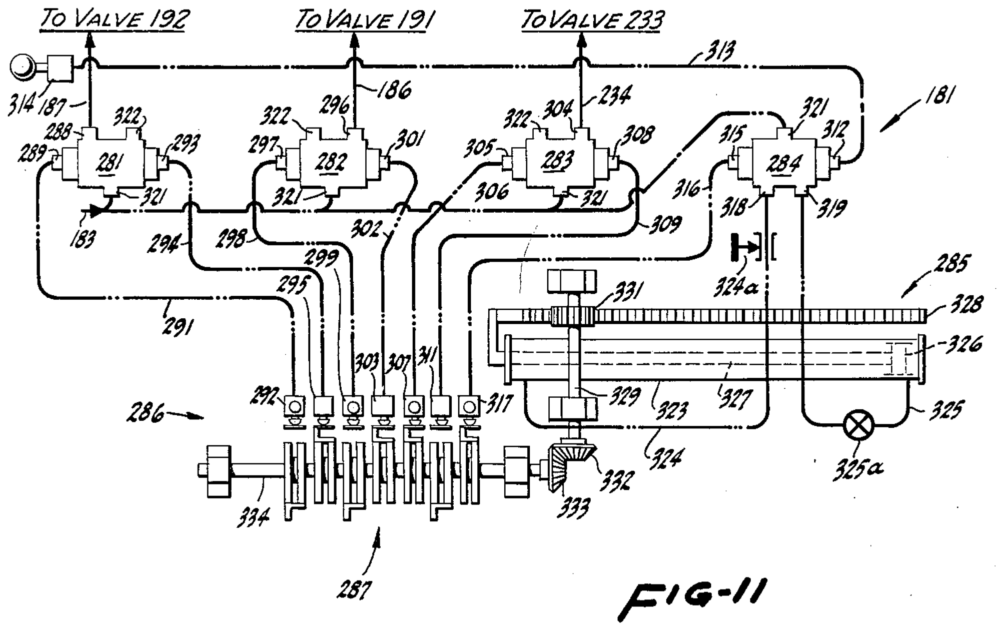
Fig. 11 is a schematic detail of the cycle timer forming a part of the control system illustrated in Fig. 10.

As diagrammatically indicated in Fig. 11, the cycle timer 181 includes four conventional four-way spool or piston valves 281, 282, 283, and 284; an air motor generally designated by the reference numeral 285 and under the control of the valve 284; and a bank of bleed valves generally indicated by the reference numeral 286 for controlling the valves 281, 282, 283, and 284, said bleed valves being under the control of a bank of cams generally designated by the reference numeral 287 and actuated by the air motor 285.

More specifically, the valve 281 includes a port 288 communicating through the line 187 with valve 192, a port 289 communicating through a line 291 with one bleed valve 292 of the bank of bleed valves 286, and a port 293 communicating through a line 294 with another bleed valve 295 of the bank of valves 286.

Similarly, the valve 282 includes a port 296 communicating through the line 186 with the valve 191. Here it should be recalled that the valve 191 (Fig. 10) controls the cylinder 84, that the valve 192 controls the cylinder 83, and that the cylinders 83 and 84 control the transverse reciprocatory movement of the tamper carriage C. Included in the valve 282 is a port 297 communicating through a line 298 with a third bleed valve 299 of the bank of valves 286, and with a port 301 communicating through a line 302 with a fourth bleed valve 303 of the bank of valves 286.

Formed in the valve 283 is a port 304 communicating through the line 234 with the valve 233, this latter valve being the valve for controlling the cylinder 152 of the upper elevator unit. Also provided in the valve 283 is a port 305 communicating through a line 306 with a fifth bleed valve 307 and a port 308 communicating through a line 309 with a sixth bleed valve 311.

Provided in the valve 284 is a port 312 communicating through a line 313 with a hand operated two-way valve 314, which in turn communicates with the main air pressure line 37. Also provided in the valve 284 is a port 315 communicating through a line 316 with the seventh and last bleed valve 317 of the bank of valves 286, and with alternate ports 318 and 319.

Included in each of the four valves 281, 282, 283, and 284 is a port 321, each of these ports communicating through the line 183 with the main pressure line 37. Also included in each of these valves, other than the valve 284, is a bleed or exhaust port 322.

*Air Motor*

Figure 13:
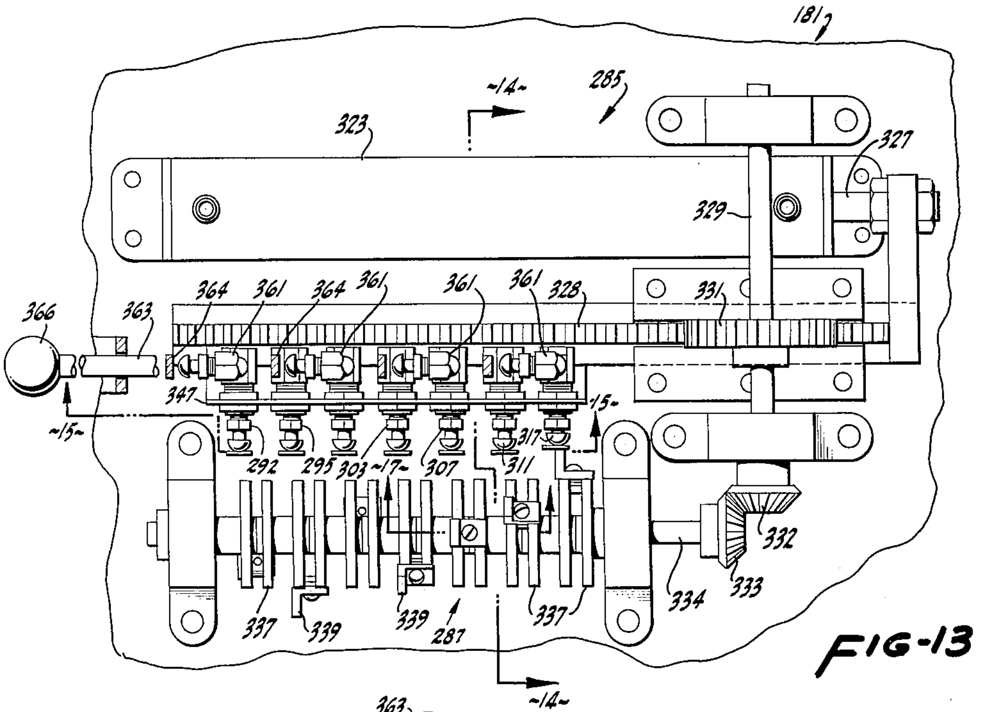
Fig. 13 is a fragmentary detail of the cam assembly for operating the bleed valves used in conjunction with the cycle timer illustrated in Fig. 11.
Figure 14:
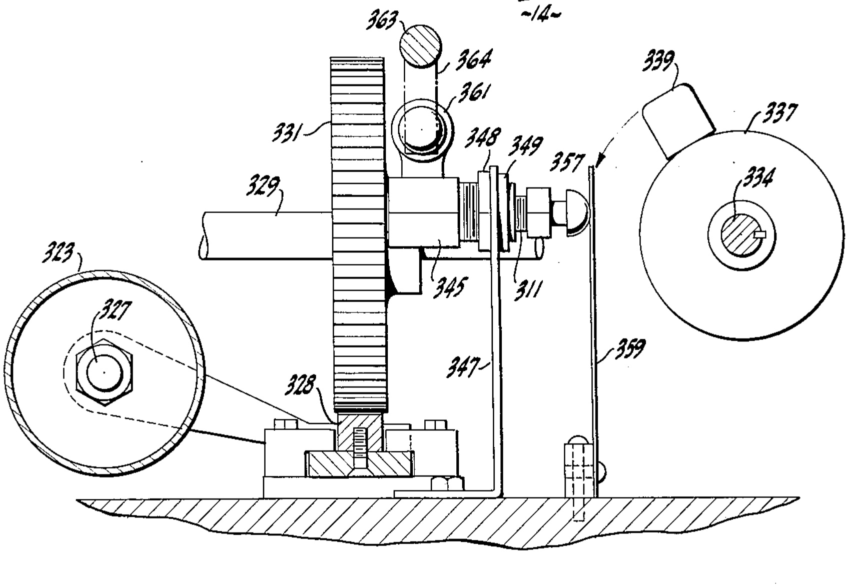
Fig. 14 is a section taken on the section line 14—14 of Fig. 13.

The air motor 285 includes a closed cylinder 323 having communication at one of its ends with the port 318 of the valve 284 through a line 324 and having communication at its opposite end with the port 319 through a line 325. Provided in the line 324 is a conventional needle valve 324*a*, and provided in the line 325 is a conventional quick-exhaust check valve 325*a*. Operatively disposed within the cylinder 323 is a piston 326, and secured thereto is a piston rod 327 extending through the left end of the cylinder as shown in Fig. 11. Formed integral with the free end of the piston rod 327 is a rack 328 paralleling the cylinder 323. Journaled to the frame of the cycle timer is a shaft 329, and fixed thereto is a pinion 331. Keyed or otherwise secured to the shaft 329 is a beveled gear 332. Meshing with another beveled gear 333 fixed to a shaft 334, which in turn is journaled on the timer frame. Mounted on the shaft 334 (Fig. 17) are hubs 335 and spacing collars 336, and locked between each hub and spacing ring is a flanged ring 337. Here it should be noted that the hubs 335 are arranged in pairs back to back and that the flanged rings 337 are likewise arranged in spaced opposed pairs generally designated by the reference numeral 338. Also, suitable means should be provided for keying the hubs 335 and spacing collars 336 to the shaft 334 and for securing the flanged rings 337 against rotation relative to the collars and spacers. As a result of this structure, each opposed pair of flanged rings 337 serves as a circular mounting or carrier for a camming lug 339 detachably and adjustably secured thereto by an interior nut 341 and bolt 342. By merely loosening the bolt 342 the camming lug 339 can be moved angularly to any desired position on the periphery of its pair of hinged rings 338. As best illustrated in Figs. 11 and 13, the bank of cams 287 are located adjacent the bank 286 of bleed valves with the cam lugs 339 in operative alignment with the bleed valves, there being one such lug for each bleed valve.

*Bleed valve details*

Figure 16:
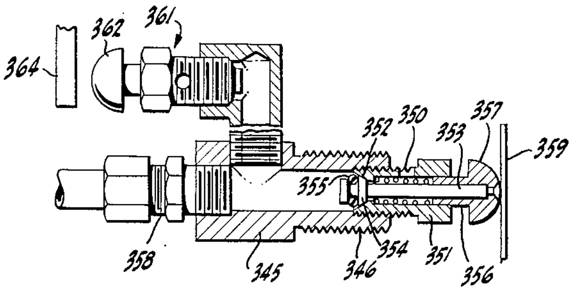
Fig. 16 is a fragmentary midsection taken through one of the bleed valves illustrated in Fig. 13 and Fig. 14.

As best illustrated in Fig. 16, each of the bleed valves 292, 295, 299, 303, 307, 311, and 317 includes a cored body 345 externally threaded as at 346 for attachment to the frame 347 of the cycle timer by nuts 348 and 349 and internally threaded for the reception of a bored valve plug 351. Formed in the inner end of the plug 351 is a tapered valve seat 352. Movably mounted within the plug 351 is valve stem 353 formed at its inner end with a truncated closure member 354 arranged to seat on the valve seat 352 and backed by an O ring 355. Secured to the outer end of the valve stem 353 is a stepped valve operator 356 terminating in a semispherical button 357. Formed in the valve plug 351 intermediate its ends is an exhaust port 350. Surrounding the valve stem 353 is a compression spring 353*a* serving to bias the valve stem to its closed position. Threaded to the rear end of the valve body 345 is a fitting 358 for attachment to one of the lines 291, 294, etc.

Preferably, there is mounted on the timer frame a series of transversely spaced, upstanding flat fingers 359, there being one such finger located immediately in front of each of the semispherical buttons 357 and which merely serve as wear plates.

As a result of this structure, the rotation of the cam lugs 339 past the semispherical buttons 357 serves to open their associated bleed valves against the biasing action of the biasing spring **353*a***.

Formed integral with each of the bleed valves just described, and as best shown in Fig. 16, is a hand operated emergency bleed valve 361 communicating with the valve body 345 and operable by a spring biased semispherical button 362. The angular relationship of the valves 361 relative to the valves 345 is accurately shown in Fig. 15, whereas in Fig. 16 the emergency valves have been rotated through an angle of 90 degrees to better illustrate their construction.

Associated with only the bank of valves 292, 299, 307, and 317 of emergency bleed valves 361 is a hand operator, including a rod 363 (Fig. 15) slidably mounted in the timer frame 347 and provided with lugs 364 disposed in alignment and adjacent the operating buttons 362. Circumscribing one end of the rod 363 is a compression spring 365 serving to hold the rod 363 in its outer, inoperative retracted position, and mounted on the opposite end of the rod is an operating knob 366.

Figure 15:
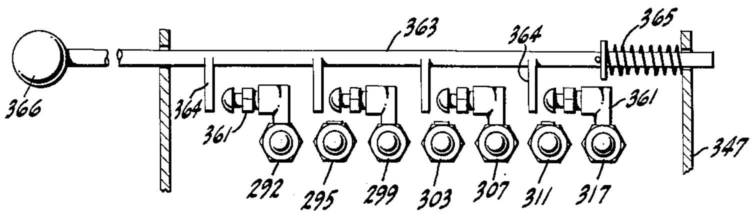
Fig. 15 is a fragmentary section taken on the section line 15—15 of Fig. 13.

As a result of this construction, the linear movement of the rod 363 to the right, as illustrated in Fig. 15, and against the biasing action of the spring 365 serves simultaneously to open each of the emergency bleed valves 292, 299, 307, and 317 of the bank of bleed valves 361; the entire system is immediately returned to its starting position, that is, with the carriage in its central position and with the elevator assemblies in their intermediate position, and this will occur regardless of the point in the cycle of operation of the machine at which the emergency knob 366 is depressed.

*Shuttle timer details*

Figure 12:
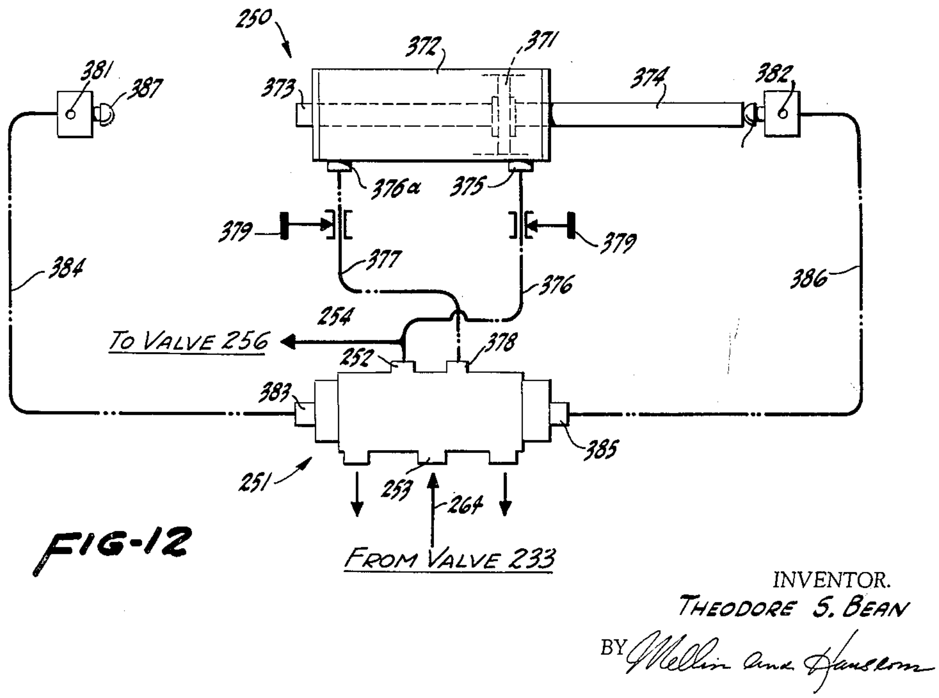
Fig. 12 is a schematic detail of the shuttle timer forming a part of the control system illustrated in Fig. 10.

As illustrated in Fig. 12 the shuttle timer 250, in addition to the balanced four-way valve 251, includes a double acting piston 371 operatively disposed within a closed cylinder 372 and provided with piston stems 373 and 374. Formed at one end of the cylinder 372 is a port 375 communicating with the port 252 of the valve 251 through a line 376. Likewise formed in the opposite end of the cylinder 372 is a port **376*a* connected through a line 377 with a port 378 of the valve 251. Inserted in each of the lines 376 and 377 is a conventional hand-operated needle valve 379 for controlling the flow of air through these lines. Mounted in alignment with the piston stems 373 and 374 are conventional spring biased exhaust valves 381 and 382. Communicating between the valve 381 and a port 383 formed in the valve 251 is a line 384, and similiarly disposed between a port 385 of the valve 251 and the exhaust valve 382 is a line 386. Each of the exhaust valves 381 and 382 includes a spring biased valve stem 387 arranged to be depressed so as to open its associated valve upon contact with one of the piston stems 373 and 374. Here it should be recalled that the shuttle timer is itself under the control of the cycle timer by reason of the fact that the air supply for the shuttle timer valve 251 is under the control of the valve 233, which in turn is under the control of the cycle timer. As a result of this construction, the valve 251 may be considered as a servo valve for it controls the operation of the cylinder 372 which in turn controls the valve 251**.

*Tamper jacks and take-off wheels*

Carried by the tamper main frame at its front and rear ends are two pairs of transversely aligned jack cylinders 391, each including a piston (not shown) and a piston rod 392. Pivoted to the free end of each piston rod 392 is a lug 393 and extending across and fixed to each pair of lugs 393 is a supporting bar 394. As a result of this construction, it will be seen that by supplying air to the upper ends of the cylinders 391 the bars 394 can be lowered to the tracks 25 and utilized as jacks for lifting the entire tamper from the tracks.

Journaled to the track main frame rearwardly of each of its flanged wheels 24 are shafts 401, and keyed thereto are flanged wheels 402. Also keyed or otherwise affixed to one pair of front and rear shafts 401 are sprocket wheels 403. Journaled on the truck main frame centrally thereof is a drive shaft 404, and keyed thereto are sprocket wheels 405 aligned with the sprocket wheels 403. Reeved about each aligned pair of sprocket wheels 403 and 405 is a sprocket chain 406. Affixed to the shaft 404 intermediate its ends is a sprocket wheel 407 serving as a means by which the shaft can be driven from any suitable drive mechanism associated with the air motor 20.

As a result of this structure, the tamper can be raised from the tracks 25; supplementary, transversely extending take-off tracks 408 (Fig. 8) can then be inserted over the tracks 25 and beneath the flanged wheels 402; and the tamper can be lowered onto the tracks 408 so that the tamper can then be driven laterally off the main track, this of course being frequently necessary so as to allow a train to pass.

*Shuttle valve exhaust actuator*

Since the transverse movement of the carriage C, and with it the tamping guns 138 when the tamping gun shoes 141 are substantially submerged in the ballast, may impose too great a strain on the tamping guns, it may be desirable to provide means for preventing the tamping guns from shuttling to their lower or submerged positions during any lateral or transverse movement of the carriage.

Figures 17, 18:
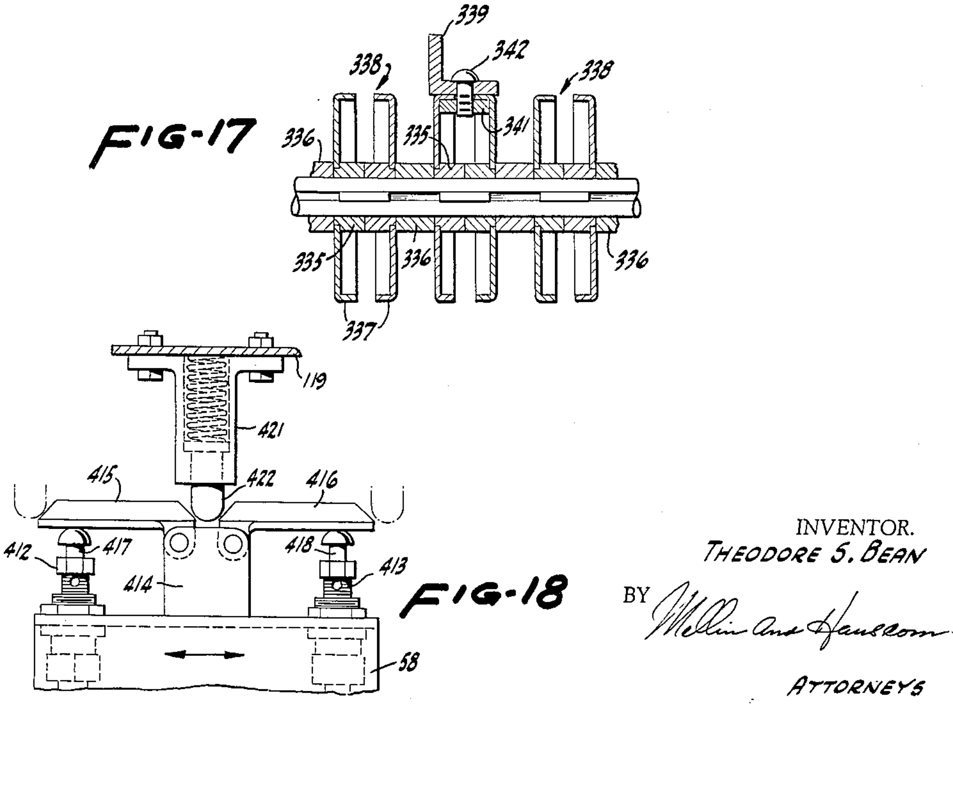
Fig. 17 is a fragmentary section taken on the section line 17—17 of Fig. 13.
Fig. 18 is a fragmentary vertical section taken on the section line 18—18 of Fig. 5 and illustrating a mechanism for venting the shuttling valves associated with the tamping guns.

To this end, each air line 254 communicating between the shuttle timer 250 and each shuttling control valve 266 (Fig. 10) is connected by a T 411 with a pair of transversely spaced, normally closed spring return valves 412 and 413 mounted, as indicated in Fig. 18, on the U frame 58 of the carriage C. Extending upwardly between and in line with the valves 412 and 413 is a lug 414 and pivoted thereto is a pair of outwardly extending valve actuating fingers 415 and 416 respectively overlying the spring biased stems 417 and 418 of the valves 412 and 413.

Bolted to the transverse beam 18 of the truck frame 11 is a depending angle section 119 (Figs. 5 6, and 18), and secured thereto in line with and midway between the fingers 415 and 416 is a socket 421. Slidable in the socket 421 is a spring biased contactor 422.

As a result of this construction, it will be seen that when the carriage C is in its central position the valves 412 and 413 will remain closed. If, however, the carriage moves to the left, the valve 413 will be opened as a result of the depression of the finger 416 in passing beneath the contactor 422. However, it should here be noted that when the finger 416 has moved to the left beyond the contactor 422, the valve 413 will return to its closed position. The length of the finger 416 therefore determines the travel of the carriage during which the line 254 will be vented to atmosphere, and which in turn determines when the tamping guns associated therewith will be restrained from assuming their lowermost positions. A corresponding action of course occurs as a result of the movement of the carriage C to the right. Here the contactor 422 depresses the left finger 415 to vent the valve 412.

*Operation*

Although as a result of the above description of the construction and operation of the various subassemblies of my tamper, the operation of the entire unit is probably clear, it may be well to here briefly summarize such operation.

Except when moving from tie to tie, the ballast tamper should be transported over the track only when the gun tampers are in their uppermost position as shown in Figs. 1 and 4. As illustrated in Fig. 1, the movement of the truck is effected by the drive chain 34 under the manual control of the operator, this per se forming no part of the present invention.

Now assume that the truck has been so located on the track that the tamping guns G are disposed over a tie which is to be leveled by tamping on either side of it and on each side of the rail associated therewith.

The elevator assemblies E are then brought to their intermediate positions, as shown in Fig. 5, through the action of the piston 112 of the cylinder 111, which, as previously explained and as indicated in Fig. 10, is under the control of the manually operated valve 211. At this point the machine is ready to be placed in actual tamping operation under the control of the cycle timer 181 and the shuttle timer 250, this, as previously described, being effected by merely opening the hand operated valve 314. The cycle timer 181 then causes the tamping mechanism to go through one complete cycle. During such a cycle the carriage C moves from its central position to one side thereof, back through its central position to the other side thereof, and finally back to its central position. In the meantime, the tamping guns 138 are moving up and down bodily in a generally arcuate path as indicated in Fig. 6, and the gun shoes 141 are vibrating in accordance with conventional practice. At the end of the cycle the tamping mechanism is automatically brought to a stop and can be repeated only by again opening the valve 314.

Also as previously described, the tamping mechanism can be brought to its home or starting position at any time by actuating the emergency control operating knob 366 without the necessity of letting the mechanism complete its normal cycle.

Furthermore, as a result of the shuttle valve exhaust actuator the tamping guns are restrained from moving to their lowermost position during the transverse movement of the carriage, this, as previously described, being an optional feature.

By supporting the tamper per se from the truck cantileverwise it is not necessary to subject the untamped ballast to the weight of the machine.

By resorting to the elevator assembly here disclosed only one of the elevator subassemblies need be elevated when progressing from tie to tie, whereas in the machine disclosed in my said Patent No. 2,821,935 it was necessary to raise the entire elevator unit when moving from tie to tie. Since this type of equipment is of necessity heavy, considerable air under pressure is required to lift the elevators, and obviously the greater the weight of the elevators the greater is the load imposed on the compressors. Since in the present machine, only one elevator subassembly is elevated when going from tie to tie, the load on the compressor unit is greatly reduced. Here, only the gun mounts are raised.

I claim:

1. A ballast tamper comprising: a truck; a carriage mounted on said truck for transverse movement thereon; a first cylinder mounted on said carriage; a first piston operatively disposed in said first cylinder; a piston rod secured at its lower end to said first piston and extending upwardly through the upper end of said first cylinder; a first elevator frame secured to said first piston rod intermediate its ends; a second piston mounted on the upper end of said piston rod; a second cylinder operatively mounted on the said second piston; a second elevator frame secured to said second cylinder; a first link pivoted at its inner end to said first elevator frame; a tamping gun pivoted at its upper end to the outer end of said first link; a pneumatic jack pivoted at one end to said second elevator frame and at its other to said first link at a point intermediate the ends thereof; and means operatively connected between said first elevator frame and said tamping gun for constraining the lower end of said tamping gun to move in an arcuate path in response to the operation of said pneumatic jack.

2. A ballast tamper comprising: a truck; a carriage mounted on said truck for transverse movement thereon; a first cylinder mounted on said carriage; a first piston operatively disposed in said first cylinder, a piston rod secured at its lower end to said first piston and extending upwardly through the upper end of said first cylinder; a first elevator frame secured to said first piston rod intermediate its ends; a second piston mounted on the upper end of said piston rod; a second cylinder operatively mounted on the said second piston; a second elevator frame secured to said second cylinder; a first link pivoted at its inner end to said first elevator frame; a tamping gun pivoted at its upper end to the outer end of said first link; a pneumatic jack pivoted at one end to said second elevator frame and at its other to said first link at a point intermediate the ends thereof; and a second link pivoted at one end to said first elevator frame below said first link and pivoted at its other end to said tamping gun intermediate the ends thereof.

3. A ballast tamper comprising: a truck; a carriage mounted on said truck for transverse movement relative thereto; a first upstanding cylinder mounted on said carriage; a double acting piston mounted in said first cylinder for vertical movement therein; a piston rod connected at its lower end to said piston and extending through the upper end of said cylinder; a first elevator frame mounted on the upper end of said piston rod; a second elevator frame mounted on said carriage above said first elevator frame; first means operatively associated with said second elevator frame for raising and lowering said second elevator frame in response to the raising and lowering of said first elevator frame; second means operatively associated with said second elevator frame for raising and lowering said second elevator frame independently of the movement of said first elevator frame; a tamping gun; means for linking the upper end of said gun to said first elevator frame; and a pneumatic jack operatively disposed between said elevator frame and said last mentioned means.

4. A ballast tamper comprising: a truck; a carriage mounted on said truck for transverse movement relative thereto; first and second pneumatic jacks each attached at one of its ends to said truck, the opposite ends of said jacks being linked respectively to the opposed ends of a crossbar and said crossbar being pivoted intermediate its ends to said carriage; a first cylinder mounted on said carriage; a first piston operatively disposed within said first cylinder; a piston rod secured at its lower end to said first piston, said piston rod extending upwardly through said first cylinder; a first elevator frame mounted on said piston rod intermediate the ends thereof; a second elevator frame mounted on said carriage for vertical movement relative thereto; a second cylinder mounted on said second elevator frame coaxially with said first cylinder; a second piston operatively disposed within said second cylinder and attached to the upper end of said piston rod; a first link pivoted at its inner end to said second frame; a tamping gun pivoted at its upper end to the outer end of said first link; a third pneumatic jack pivoted at one end thereof to said second elevator frame and pivoted at its other end to said first link; means responsive to the movement of said first link for constraining the lower end of said tamping gun to move in an arcuate path; a cycle timer communicating with a source of air pressure and communicating through various air lines and valves with said first and second jacks, said second cylinder, and said third jack for selectively controlling the flow of air alternatively to the opposed ends thereof.

5. A ballast tamper of the character defined in claim 4 wherein the flow of air alternatively to the opposed ends of said third jack is under the control of a shuttle timer.

6. A ballast tamper of the character defined in claim 4 wherein the upper and lower ends of said first cylinder are arranged to communicate alternately with a source of air under pressure through a manually controlled valve.

7. A ballast tamper comprising: a truck; a carriage mounted on said truck for transverse movement thereon; a tamping gun mounted on said carriage for movement in a vertical plane; means for reciprocating said carriage transversely of said truck; means for reciprocating said elevator in said vertical plane; and means responsive to the transverse movement of said carriage for constraining said elevator to move to its uppermost vertical position.

8. A ballast tamper of the character defined in claim 1 including means for reciprocating said carriage transversely of said frame; means for activating said pneumatic jack; and means responsive to the transverse movement of sid carriage for constraining said pneumatic jack to move to its expanded position.

9. A ballast tamper of the character defined in claim 2 including means for reciprocating said carriage transversely of said frame; means for activating said pneumatic jack; and means responsive to the transverse movement of said carriage for constraining said pneumatic jack to move to its expanded position.

10. A ballast tamper of the character defined in claim 4 including means for reciprocating said carriage transversely of said frame; means for activating said pneumatic jack; and means responsive to the transverse movement of said carriage for constraining said pneumatic jack to move to its expanded position.

11. A ballast tamper of the character defined in claim 5 including means for reciprocating said carriage transversely of said frame; means for activating said pneumatic jack; and means responsive to the transverse movement of said carriage for constraining said pneumatic jack to move to its expanded position.

References Cited in the file of this patent

UNITED STATES PATENTS

| | | |
|---|---|---|
| 1,351,246 | Hastings | Aug. 31, 1920 |
| 1,415,193 | Robinson | May 9, 1922 |
| 1,415,194 | Robinson | May 9, 1922 |
| 2,511,184 | Walling | June 13, 1950 |
| 2,712,287 | Zurmuhle | July 5, 1955 |
| 2,789,516 | Hursh et al. | Apr. 23, 1957 |
| 2,821,935 | Bean | Feb. 4, 1958 |
| 2,843,055 | Hursh et al. | July 15, 1958 |
| 2,847,943 | Plasser et al. | Aug. 19, 1958 |
| 2,855,862 | Kind | Oct. 14, 1958 |

FOREIGN PATENTS

| | | |
|---|---|---|
| 203,755 | Australia | Oct. 16, 1956 |
| 516,513 | Belgium | Jan. 15, 1953 |
| 940,905 | Germany | Mar. 29, 1956 |